United States Patent [19]

Montgomery

[11] 4,211,497

[45] Jul. 8, 1980

[54] DATA INPUT SYSTEM

[76] Inventor: Edward B. Montgomery, 6720 Greenwich La., Dallas, Tex. 75230

[21] Appl. No.: 886,102

[22] Filed: Mar. 13, 1978

Related U.S. Application Data

[63] Continuation-in-part of Ser. No. 670,686, Mar. 29, 1976, abandoned, which is a continuation of Ser. No. 447,218, Mar. 1, 1974, abandoned.

[51] Int. Cl.² .............................................. B41J 5/10
[52] U.S. Cl. ..................................... 400/486; 400/479
[58] Field of Search .................. 400/52, 87, 477, 479, 400/479.1, 479.2, 486; 200/5 R, 5 A

[56] References Cited

U.S. PATENT DOCUMENTS

| 2,040,248 | 5/1936 | Dvorak et al. ...................... 400/486 |
| 3,600,528 | 8/1971 | Leposavic ...................... 35/9 B UX |
| 3,847,263 | 11/1974 | X ...................................... 400/486 |
| 3,929,216 | 12/1975 | Einbinder ...................... 400/486 X |

FOREIGN PATENT DOCUMENTS 1158983  6/1958  France ................................. 400/165.1

OTHER PUBLICATIONS

IBM Tech. Disc. Bulletin, P. E. Stuckert, "Input Keyboard," vol. 14, No. 3, Aug. 1971, pp. 952–959.

Primary Examiner—Paul T. Sewell
Attorney, Agent, or Firm—Kinney, Lange, Braddock, Westman and Fairbairn

[57] ABSTRACT

This disclosure relates to data input system keyboards that are designed in accordance with human engineering principles for use in conjunction with a specific data input activity. Each keyboard has a plurality of keys adapted for actuation in response to minimum movement of the fingers of an operator and each having a substantially smooth upper surface to facilitate sliding movement of the fingers of the operator between the keys of the keyboard. The keys of each keyboard are arranged such that the most often used keys are situated in the most readily accessible locations with respect to the fingers of the operator, and with keys which are frequently utilized in sequence. That is, the keys that comprise digraphs & trigrams as well as keys carrying individual words or characters used frequently in sequence are positioned adjacent one another. The keys may be arranged along arcuate paths corresponding to the natural movement of the fingers, hands, and arms of the operator.

13 Claims, 18 Drawing Figures

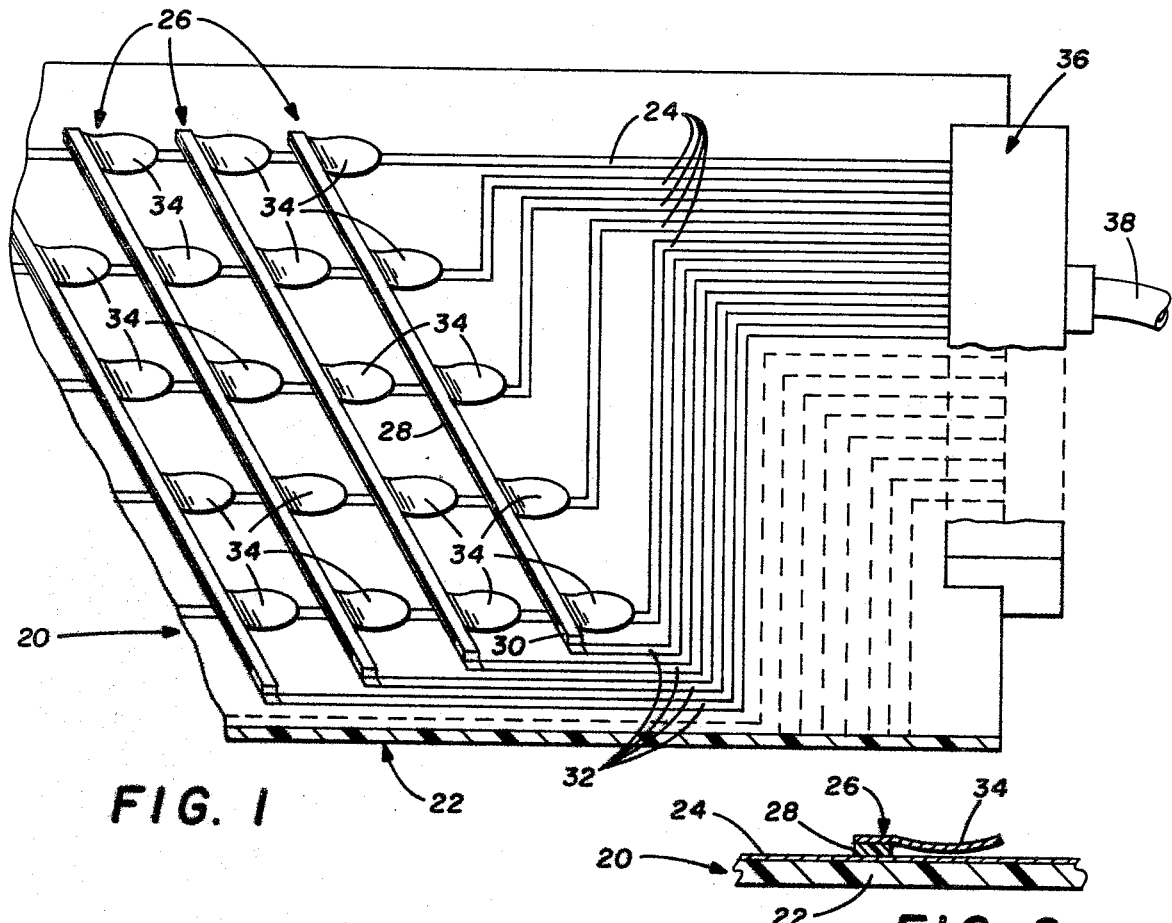
FIG. 1
FIG. 2
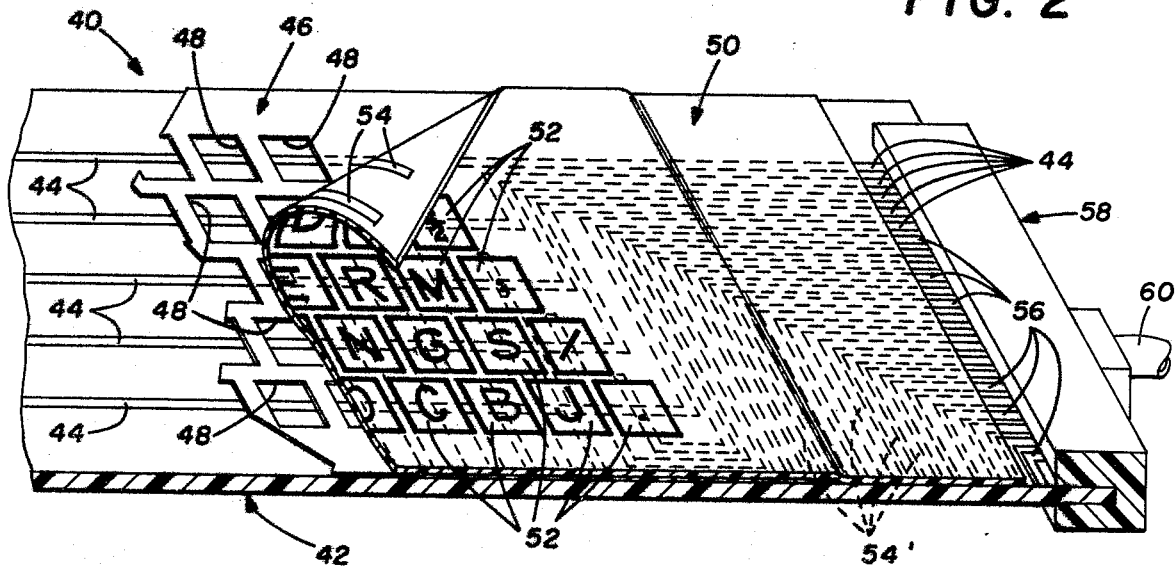
FIG. 3

```
1 2 3 Z X W V
4 5 6 Q U A D Y ½
7 8 9 0 T H E R M ;
¢ , . P L I N G S /
$ ( ) & K F O C B J .
```
FIG. 9
```
W D T B K S Z
 P A H I N G
J F L E O U M
 Y C R V Q X
```
FIG. 10
```
Z X W M J
Y A D V P
B T H E R K
  L I N G S
  F O C U Q
```
FIG. 11
```
  1      Z X W V ( )
4 2      J Y A N D M     (SPACE)
7 5 3    I T H E R B
8 6 0    O L I N G S
  9      P K F O C U Q
(SPACE)
```
FIG. 12
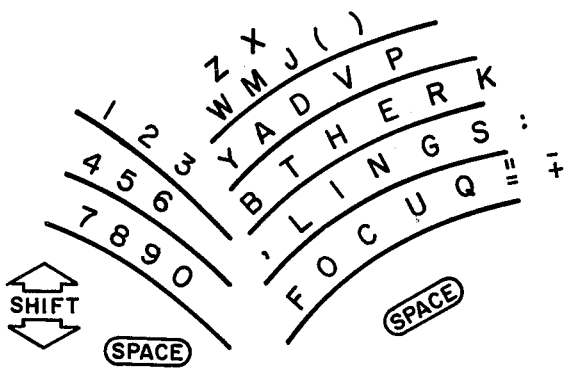
FIG. 13
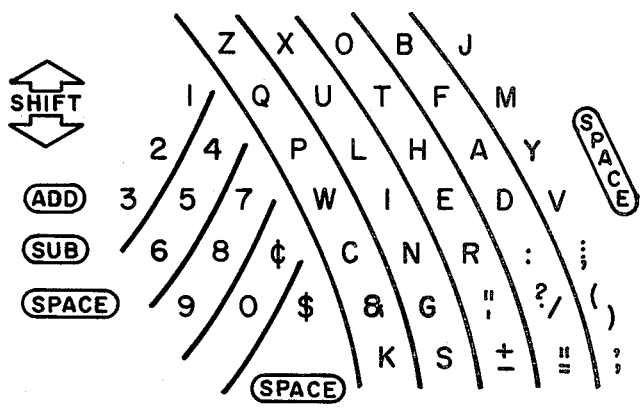
FIG. 14

DATA INPUT SYSTEM

CROSS REFERENCE TO RELATED APPLICATIONS

This application is a continuation-in-part of my copending application Ser. No. 670,686, filed Mar. 29, 1976 for Data Input System, which in turn was a continuation of my application Ser. No. 447,218, filed Mar. 1, 1974, for Data Input System, now abandoned.

BACKGROUND AND SUMMARY OF THE INVENTION

This invention relates to a data input system, and more particularly to a data input system utilizing low cost keyboards designed with maximum emphasis on human engineering considerations.

At the present time, most modern keyboard designs trace directly from concepts associated with manual typewriter keyboards. In such devices, keytops (mounted in keylevers) are depressed to effect actuation of typelevers each carrying a set typeface. The keylevers are connected to the typelevers, either directly or mechanically by means of gear segments. It is therefore necessary to depress the selected keytop through a substantial distance in order to impart sufficient energy to the associated typeface to effect typing. This in turn produces a physiological feedback to the typist indicating that the proper pressure and motion have been utilized to actuate the keytop.

Another problem which has been carried over from early typewriters into many modern keyboard designs relates to the arrangement of the keytops on the keyboard. Early typewriter designers were apparently primarily concerned with mechanical requirements including such considerations as economy in manufacture, minimization of wear, etc. There was even an attempt to equalize use of each finger in typing. This led to the now standard keytop arrangement in which many of the most often used keys must be actuated either by the weakest fingers of the hands, or by the fingers of the left hand, which in most persons is the weaker hand. A related problem involves the fact that the standard keytop arrangement does not take into account the fact that within the framework of particular uses, many keys are quite frequently used in particular sequences.

It should be noted that the foregoing problems of keyboard design have been appreciated heretofore. Thus, various attempts have been made to provide typewriters and similar devices incorporating substantially improved keyboard designs. For the most part these improvements have not gained wide-spread acceptance, largely because typists skilled in the use of the standard keyboard design have been unwilling to change to an improved design. This is of course understandable insofar as the arrangement of the keys of the typewriter is concerned since the use of a keyboard having a key arrangement other than the standard arrangement would require either a substantial amount of learning time or a substantial amount of concentration during use of the device. However, as is well known to keyboard designers, the hesitancy of typists to accept improvements in keyboard design is not limited to changes in key arrangements. To the contrary, it has now been established that a keyboard design may be unacceptable to skilled typists unless it provides the physiological feedback mentioned hereinbefore in connection with manual typewriters. For this reason modern electric typewriters utilize keytops which are in no way linked mechanically to the actual typing apparatus but which are nevertheless mounted so as to provide a "touch" similar to that of a manual typewriter.

It has now been recognized that there exists a need for a data input system adapted for use by persons who are not committed to the traditional operation of typewriters. For example, by means of presently available computers it is now possible to perform routine household bookkeeping functions such as paying bills, budgeting, and the like. Other activities in and around the home can also be facilitated by means of such a data input system, for example, docketing of appointments and important dates, storing and retrieving items of important information, etc. As our society changes many additional uses of keyboards will evolve. For example, shopping via keyboards coupled with video systems may develop. The need to minimize human effort in the performance of routine tasks will afford many instances for keyboards to minimize effort, time and energy.

Perhaps a more important function of such a data input system is in the area of programmed learning systems, wherein such a data input system may be utilized in connection with a display device, for example, home television sets, to provide student input to the teaching system. It should be noted in this regard that in many instances the particular functions performed are so disassociated from ordinary typing that even a skilled typist may utilize the data input system without recognizing even subconsciously the fact that entries are being made which in many ways are similar to typing.

In accordance with the broader aspects of the invention, a data input system comprises one or more keyboards each associated with a particular data input activity. For example, referring to the foregoing examples, different keyboards are provided for bookkeeping purposes, for docketing purposes, for professional and business operations, and for programmed learning systems. The keyboards are interchangeable with other parts of these or other systems, and are designed so as to be available to the ultimate user at very low cost. Perhaps more importantly, the keyboards are designed so as to place maximum emphasis on human engineering concepts, both with respect to the manner in which the keyboard operates and with respect to key placement.

Considering first the operation of the keyboard, each keying operation allows the closing of an electrical circuit. This keyboard is designed to minimize movement, so as to reduce the substantial finger motion which is required in order to operate a conventional typewriter keyboard. Moreover, the upper surface of the keyboard is substantially flush so that the operator is permitted to move from key to key by means of a simple sliding motion. With adjacent keys arranged to carry sets of the most commonly used sequential letters, digraphs and trigrams (two and three letter combinations) may be typed without raising or stroking the operative finger. Thus speed in typing words such as THE, TO, OF, and AND is greatly increased.

The upper surface of the keyboard may be provided with small raised projections, either in the form of Braille dots for use by blind persons, or in the form of indicators relating to particular "home" positions.

With respect to key arrangements, the particular keys represented on a particular keyboard will of course be chosen in accordance with the function to be performed by means of the keyboard. In all cases, however, keys bearing symbols which are commonly utilized in association with other symbols are positioned as nearly as possible adjacent one another on the keyboard. For example, in the English language, the letter Q is substantially always followed by the letter U and, accordingly, the keys bearing these letters should be placed adjacent one another in a keyboard incorporating the present invention if a higher frequency does not contraindicate such positioning.

Extensive studies have been made to determine the more frequently used letter or character combinations, including digraphs (of; tu; in; is; etc.) trigrams (the; and; ing; ent; ion; etc.). The present keyboard utilizes arrangement whereby the letter or character for the most commonly used digraphs and trigrams are on adjacent keys and the keys do not have to be separately stroked for operation, but are activated with a sliding motion.

In accordance with the particular use of the keyboard, the keytops may be arranged in arcuate rows so as to accommodate the natural motion of the fingers, hands, and arms of the operator. These arcuate rows may extend in whatever directions provide most effective use for a particular keyboard -- for example a user may be left or right handed, have physical handicaps such as palsy, missing members, etc. In all cases stroking is not necessary, but sliding the fingers to adjacent keys will cause activation.

In accordance with more specific aspects of the invention, a data input system incorporating the present invention may be utilized as a part of a programmed learning system. In such instances, a particular keyboard constructed in accordance with the invention may be associated with individual curriculums in the programmed learning system if special symbol sets are required, such as for foreign language alphabets, computer programming, mechanical designing, etc. The keyboard is connected through appropriate circuitry to a central processor or computer, and a return path from the central processor is provided to a suitable display device, which may comprise a conventional television receiver and/or a hard copy printer. In the use of the programmed learning systems, the central processor may direct a question to the student through the display device. The student then responds by means of the keyboard. If the correct response is given, the central processor so indicates and proceeds to the next question. If an incorrect response is given, the central processor so indicates and the student is given another opportunity to provide the correct answer. Details of these operations depend on the programmed learning system as well as the computer program used. Still another specific application of the invention relates to input systems for use in conjunction with music synthesizers and similar devices. It has been found that by means of the present invention it is possible to provide not only considerably more latitude in the design of input systems for such devices, but also considerably more freedom and flexibility in their use. At present music synthesizers must, to a considerable extent, be programmed by such devices as patch cords, switches and potentiometers. This seriously inhibits virtuosity. A touch responsive keyboard, properly designed, will allow freedom of circuit adjusting at will just as keys are struck so that continuing change will be possible throughout a performance.

Other modalities of this fundamental keyboard concept include drawings, photographs, diagrams, etc., that are a part of the touch sensitive circuit. One example of such use is for learning of anatomy and other system diagram related curricular items. Design of large scale simulations may be expedited by such a system. Architectural design, structural design, industrial design, etc., can all be performed by keyboards designed for just such functions, allowing high speed visualization and/or testing of design concepts.

DESCRIPTION OF THE DRAWINGS

A more complete understanding of the invention may be had by reference to the following Detailed Description when taken in conjunction with the accompanying Drawings, wherein:

FIG. 1 is an illustration of a rudimentary keyboard incorporating the invention in which certain parts have been broken away to more clearly illustrate certain features of the invention;

FIG. 2 is a partial vertical section view of the keyboard shown in FIG. 1;

FIG. 3 is a partial section view of a keyboard useful in the practice of the invention;

FIGS. 9, 10, 11, 12, 13, and 14 are illustrations of various key arrangements useful in the practice of the invention;

FIG. 18 is an illustration of a key arrangement placing the most commonly used trigrams and digraphs on adjacent keys for facilitating wiping motions for typing English.

DETAILED DESCRIPTION

Figure 4:
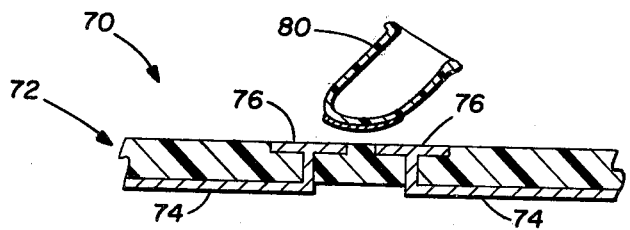
FIGS. 4, 5, 6 and 7 are partial section views of various alternative keyboard designs incorporating the invention.

Referring now to the Drawings, and particularly to FIG. 1 thereof, there is illustrated a rudimentary keyboard 20 incorporating the invention. The keyboard 20 comprises a base 22 formed from an electrically insulating material. For example, the base 22 may be manufactured in accordance with any of the various techniques commonly employed in the electronic components manufacturing industry in the fabrication of printed circuit boards. A plurality of conductive strips 24 are formed on the base 22 and extend longitudinally with respect thereto. The strips 24 may be formed by means of various techniques commonly employed in the manufacture of printed circuit boards.

A plurality of crossbars 26 are mounted on the base 22 and extend transversely with respect to the strips 24. As is best shown in FIG. 2, the portions of the crossbars 26 overlying the strips 24 are insulated therefrom by means of spacers 28 formed from an electrically insulating material. Referring again to FIG. 1, one end of each crossbar 26 comprises a foot 30 which is electrically connected to a conductive strip 32 formed on the base 22. The strips 32 are preferably formed on the base 22 simultaneously with the strips 24 and by means of the same manufacturing technique.

Each crossbar 26 of the keyboard 20 comprises a plurality of keys 34. The term key as used throughout the specification and claims is not intended to refer to a particular structure and is intended to indicate only a point or area of digital manipulation. Each key 34 is positioned in alignment with one of the strips 24. Therefore, whenever one of the keys 34 is depressed, an electrical connection is established between the strip 24 underlying the depressed key 34 and the strip 32 that is electrically connected to the crossbar 26 which supports the key 34. It will be understood that the particular electrical connection thus formed is individual to the depressed key 34 and cannot be formed by depressing any other key 34. The crossbars 26 and the keys 34 are preferably formed from a conductive material having sufficient resiliency that the keys 34 are returned to the position illustrated in FIG. 2 immediately upon release.

The keyboard 20 may be received in a conventional edge connector 36. The edge connector 36 comprises apparatus for mechanically connecting to the keyboard 20 and a plurality of electrical contact members. Each electrical contact member of the edge connector 36 engages and forms an electrical connection with one of the conductive strips 24 and 32 formed on the base 22. The edge connector 36 further comprises a cable 38 multiconnector which conducts current from the keyboard 20 to associated electrical apparatus (not shown). An alternate system would position more of the intermediate electrical apparatus on the keyboard. For example, key rollover, key bounce and other signal correcting and encoding functions might be a part of the printed circuit on the board.

In FIG. 3, there is shown a second keyboard 40 incorporating the invention. The keyboard 40 comprises a base 42 formed from an electrically insulated material. For example, the base 42 may be formed by means of any of the various techniques commonly employed in the electronic components manufacturing industry in the fabrication of printed circuit boards.

A plurality of electrically conductive strips 44 are formed on the base 42 and extend longitudinally with respect thereto. The strips 44 are preferably formed on the base 42 by means of one of the various techniques commonly employed in the manufacture of printed circuit boards.

A sheet 46 formed from an electrically insulating material overlies the base 42 and the conductive strips 44 formed thereon. The sheet 46 is preferably quite thin and dimensionally stable. For example, the sheet 46 may be formed from vinyl, mica, or the like. The sheet 46 has a plurality of rectangular apertures 48 formed therethrough at predetermined locations each aligned with a strip 44. It will be understood that the apertures 48 may comprise various shapes in accordance with the requirements of particular applications of the invention.

A sheet 50 formed from an electrically insulating material overlies the sheet 46. The sheet 50 is formed from a material that is dimensionally stable and relatively flexible, for example, vinyl, or the like. The obverse side of the sheet 50 comprises a plurality of keytop indicia 52 each aligned with one of the apertures 48 formed in the sheet 46. The keytop indicia 52 may be formed on the sheet 50 by means of conventional techniques, for example, printing, embossing, or the like.

A plurality of flexible conductive strips 54 are formed on the reverse side of the sheet 50. The strips 54 are preferably formed by one of the various techniques commonly employed in the manufacture of some prior art keyboards. For example, conducting elastomeric strips may be cemented, or conducting elastomeric ink may be used to print the conduction strips on the bottom side of the sheet.

In the region of the apertures 48 formed in the sheet 46, the conductive strips 54 formed on the reverse side of the sheet 50 extend transversely with respect to the conductive strips 44 formed on the base 42. Moreover, the strips 54 are aligned with the apertures 48 formed in the sheet 46. Each strip 54 then extends to a portion 54' which is aligned with conductive strips 56 formed on the base 42. The strips 56 are formed simultaneously with the strips 44 and by means of identical manufacturing techniques. The sheet 46 is terminated in the region of the portions 54' of the strips 54, and an electrical connection is formed between each portion 54' of each strip 54 and the aligned strip 56 and the base 52.

The sheet 50 has sufficient resiliency that the sheet 46 normally maintains separation between the conductive strips 54 on the sheet 50 and the conductive strips 44 formed on the base 42. However, whenever one of the keytop indicia 52 is depressed, one of the conductive strips 54 engages one of the conductive strips 44 and an electrical connection is formed therebetween. It will be understood that the particular electrical connection thus formed is unique to the depressed keytop indicia 52 on the upper side of the sheet 50, and cannot be formed by depressing any other keytop indicia 52 of the keyboard 40. Upon release of the keytop indicia 52, the resiliency of the sheet 50 immediately disengages the conductive strip 54 formed thereon from the underlying conductive strip 44 formed on the base 42.

The keyboard 40 may be received in a conventional edge connector 58. The edge connector 58 comprises apparatus for mechanically securing the keyboard 40 thereto. The edge connector 58 further comprises a plurality of electrical contacts each engaging and forming an electrical connection with one of the strips 44 and 56 formed on the base 42. By this means an electrical connection formed between one of the strips 44 and one of the strips 54 by depressing one of the keytop indicia 52 is transferred to the edge connector 58 and hence to associated electrical apparatus through a cable 60 extending from the edge connector 58.

FIGS. 4–7 illustrate various additional keyboards incorporating the invention. Referring particularly to FIG. 4, there is shown a keyboard 70 comprising a base 72 formed from an electrically insulating material and a plurality of conductive strips 74 formed on the base 72. Both the base 72 and the conductive strip 74 may be formed by means of various techniques commonly employed in the manufacture of printed circuit boards.

The conductive strips 74 extend through the base 72 and are electrically connected to spaced apart, electrically conductive contact pads 76. The contact pads 76 are arranged in pairs, with each such pair defining one of the keys of the keyboard 70. It will of course be understood that the keyboard 70 typically can comprise from a few to a relatively large number of individual keys.

The keyboard 70 is actuated by an operator establishing a current path between the contact pads 76 comprising the selected key of the keyboard. In those applications in which a low conductivity current path is satisfactory, such a path may be established through the finger of the operator which is positioned such that it bridges the two contact pads 76 comprising the selected key. In those applications in which a relatively high conductivity path is required, the operator may employ a "thimble" 80 formed from a flexible material or gloves having a region of high conductivity material formed thereon. The thimble or thimbles 80 is worn on the finger of the operator and is utilized to form an electrical connection between the contact pads 76 comprising the selected key of the keyboard 70.

The keyboard 70 may be received in a conventional edge connector of the type illustrated in FIGS. 1 and 2 in conjunction with the keyboards 20 and 40. The edge connector includes apparatus for mechanical connection to the keyboard 70 and a plurality of electrical contacts each of which establishes an electrical connection with one of the conductive strips 74 on the base 72. The edge connector functions to transfer the fact that a particular key comprising the keyboard 70 has been actuated to associated electrical apparatus.

Figure 5:
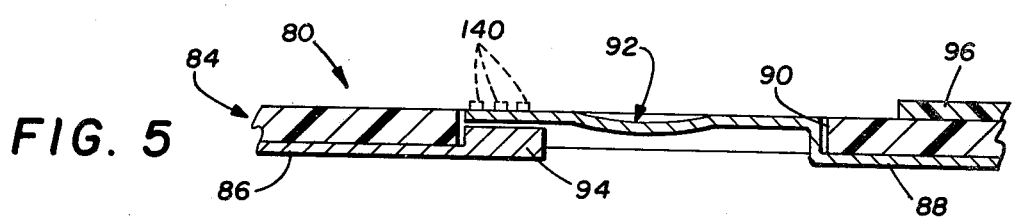

A keyboard 82 incorporating the invention is illustrated in FIG. 5. The keyboard 82 comprises a base 84 formed from an electrically insulated material and a plurality of electrically conductive strips 88 formed on the base 84. Both the base 84 and the strips 86 and 88 may be fabricated by means of various techniques commonly employed in the manufacture of printed circuit boards.

The base 84 of the keyboard 82 has a plurality of apertures 90 formed therein. Each conductive strip 88 extends to a keytop 92 positioned in one of the apertures 90. Each strip 84 extends to a contact pad 94 positioned in one of the apertures 90 under the keytop 92 located therein.

The keytops 92 and the contact pads 94 are arranged in sets, with each set defining one of the keys of the keyboard 82, it being understood that the keyboard typically comprises a relatively large number of keys. The keytops 92 are formed from a material having sufficient resiliency so that a gap is normally maintained between the keytops 92 and the contact pads 94. The keyboard 82 is actuated by depressing the keytop 92 of the selected key until it engages its associated contact pad 94, whereby an electrical connection is established between the keytop 92 and the contact pad 94 of the selected key. Upon release, the resiliency of the keytop 92 returns the component parts of the key to the positions illustrated in FIG. 5.

The keyboard 82 may be utilized in conjunction with a conventional edge connector. The edge connector includes apparatus for mechanically securing the keyboard 82 and the connector together and electrical contacts for establishing an electrical connection with each of the strips 86 and 88 of the keyboard 82. The edge connector in turn functions to transfer the fact that one of the keys comprising the keyboard 82 has been closed to associated electrical apparatus.

FIG. 5 further illustrates a modification of the keyboard 82. The keyboard 82 may be provided with a protective layer 96 formed across the upper surface of the base 84. It will be understood that the protective layer 96 must have sufficient resiliency to facilitate manipulation of a selected keytop 92 into engagement with the underlying contact pad 94 and to spring back into its original position. The protective layer 96 may be provided with keytop indicia, which may be formed on the layer 96 by means of conventional techniques, such as printing, embossing, etc.

Figure 6:
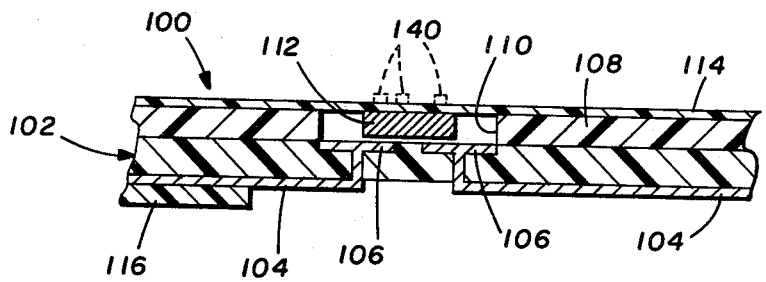

A keyboard 100 incorporating the invention is illustrated in FIG. 6. The keyboard 100 includes a base 102 formed from an electrically insulating material and a plurality of electrically conductive strips 104 formed on the base 102. Both the base 102 and the strips 104 may be fabricated by means of various manufacturing techniques commonly employed in the manufacture of printed circuit boards.

The strips 104 extend through the base 102 and are electrically connected to spaced contact pads 106. The contact pads 106 are arranged in pairs, with each pair being individual to one of the keys of the keyboard. It will of course be understood that the keyboard 100 typically comprises from a few to a relatively large number of individual keys, each including a spaced apart pair of contact pads 106.

A spacer 108 extends over the base 102 and has a plurality of apertures 110 formed therein, each corresponding to one of the keys of the keyboard 100. An electrically conductive contact member 112 is positioned within each aperture 110. The contact members 112 are supported by a resilient protective layer 114 extending over the spacer 108, and having keytop indicia formed thereon corresponding to each key of the keyboard 100.

The keyboard 100 is actuated by depressing the keytop indicia of the protective layer 114 corresponding to the selected key. By this means the contact member 112 of the selected key is moved into engagement with the underlying contact pads 106, thereby forming an electrical connection between the contact pads 106 of the selected key. Upon release of the key, the component parts of the keyboard 100 are returned to the positions illustrated in FIG. 6 by the resiliency of the layer 114.

The keyboard 100 may be utilized in conjunction with a conventional edge connector. The edge connector includes apparatus for mechanical connection to the keyboard 100, and a plurality of electrical contacts each individual to one of the strips 104 of the keyboard 100 for establishing an electrical connection with the strips following insertion of the keyboard 100 into the edge connector. The edge connector in turn functions to transfer the fact that a particular key of the keyboard 100 has been actuated to associated electrical apparatus.

FIG. 6 further illustrates a modification of the keyboard 100. The keyboard may be provided with a protective layer 116 formed on the underside of the base 102 and overlying the conductive strips 104 thereon. For example, the layer 116 may comprise a relatively thin layer formed from a suitable plastic material which may be bonded to the base 102 by any of various conventional techniques. Those skilled in the art will appreciate the fact that by means of the protective layers 114 and 116 on the opposite sides of the keyboard 100, there is provided a completely enclosed keyboard structure.

Figure 7:
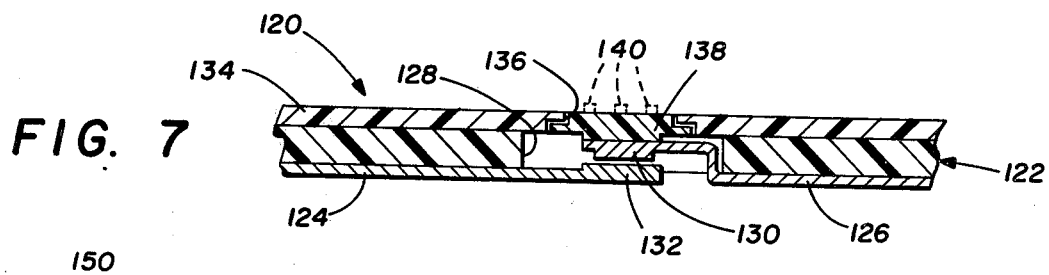

A keyboard 120 incorporating the invention is illustrated in FIG. 7. The keyboard 120 includes a base 122 formed from an electrically insulated material and a plurality of electrically conductive strips 124 and 126 formed on the base 122. Both the base 122 and the electrically conductive strips 124 and 126 may be fabricated by means of one of the various techniques commonly employed in the manufacture of printed circuit boards.

The base 122 of the keyboard 120 has a plurality of apertures 128 formed therein, each corresponding to one of the keys of the keyboard. Each strip 126 extends to a contact pad 130 which is resiliently supported in one of the apertures 128. Each strip 124 extends to a contact pad 132 underlying an associated contact pad 130. The contact pads 130 and 132 are arranged in sets, with each set comprising a particular key of the keyboard 120. It will be understood that the keyboard 120 typically comprises a relatively large number of keys each of which includes a contact pad 130 and a contact pad 132.

A layer 134 extends over the base 122 and has a plurality of apertures 136 formed therein. Each aperture 136 receives a keytop 138 individual to one of the keys of the keyboard 120 and having keytop indicia formed thereon appropriate to its respective key. The keyboard 120 is actuated by depressing the keytop 138 of the selected key, thereby moving the underlying contact pad 130 downwardly and into engagement with its associated contact pad 132. By this means there is formed an electrical connection between the contact pads 130 and 132 corresponding to the selected key. Upon release of the keytop 138, the resiliency of the strip 126 returns the component parts of the keyboard 120 to the positions illustrated in FIG. 7.

The keyboard 120 may be utilized in conjunction with a conventional edge connector of the type illustrated in FIGS. 1 and 2 in connection with the keyboards 20 and 40. The edge connector includes apparatus for mechanical connection to the keyboard 120 following insertion of the keyboard therein, and a plurality of electrical contacts each corresponding to one of the strips 124 and 126 of the keyboard 120. The contacts function to establish an electrical connection with each strip 124 and 126 following insertion of the keyboard 120 into the edge connector. The edge connector in turn functions to transfer the fact that a particular key of the keyboard 120 has been enclosed to associated electrical apparatus.

FIGS. 5, 6, and 7 further illustrate a modification of the invention whereby raised projections 140 are provided on at least selected keys comprising a keyboard incorporating the invention. The projections 140 may comprise Braille dots, thereby enabling blind persons to utilize the keyboard. Alternatively, the raised projections 140 may be utilized to designate certain keys of the keyboard as "home" keys, thereby facilitating at least a modified version of the technique known as touch typing.

Those skilled in the art will appreciate the fact that each of the keyboards shown in FIGS. 3-7 is adapted for extremely low cost manufacture when compared with conventional keyboard designs. This is highly advantageous in that it permits each keyboard to be designed strictly in accordance with the requirements of the particular data inputting activity and eliminates the compromises which are often required when keyboards are designed for use in conjunction with multiple date inputting activities.

FIGS. 3-7 further illustrate a very important feature of the present invention. In each of the keyboards 40, 70, 82, 100, and 120 illustrated in these drawing figures, the upper surface of the keyboard is at least substantially smooth, if not entirely smooth. This is for the purpose of eliminating all impediments to lateral motion of the fingers of the operator across the keyboard surface, thereby permitting the operator to slide his fingers from key to key during operation of the device. In this regard it will be understood that in those embodiments of the invention in which the raised dots 140 are utilized, the projections 140 preferably have minimal vertical dimensions so as not to impede the sliding movement of the fingers of the operator across the keys of the keyboard. It will be further understood that the keys of each of the keyboards illustrated in FIGS. 2-7 are adapted for actuation with minimal vertical movement of the operator's fingers. Those skilled in the art will appreciate the fact that these two features of the invention comprise a substantial improvement over conventional keyboard designs when considered from the standpoint of human engineering.

Human engineering is further utilized in the practice of the invention with respect to the arrangement of the keys of a keyboard which is utilized as the data input device for a particular activity. For example, the key arrangements illustrated in FIGS. 9-14 are all based on analysis of trigram occurrence in the English language. Such analysis reveals the fact that the sequence of letters T-H-E occurs far more frequently than any other. Therefore, in each of the keyboards illustrated in FIGS. 9-14 the keys for inputting the letters T, H, and E are located adjacent one to another to permit the operator to simply slide his finger from one key to the next when inputting the letter sequence T-H-E. It will be appreciated that this key arrangement is effective in substantially increasing the potential data input rate when the present invention is used as well as materially simplifying the motions required.

Further analysis of the various key arrangements illustrated in FIGS. 9-14 will reveal the fact that certain other letter arrangements are common thereto. For example, in each arrangement the letters I, N, and G are located adjacent one another. The same is true for the letter sequence Q-U and for the letter sequence A-D. Still another feature of the various key arrangements illustrated in FIGS. 9-14 is the fact that these frequently used letters and letter sequences are positioned for actuation by one or two fingers of the operator with little or no motion of the hand in order to position the fingers in alignment with these keys. Conversely, infrequently used letters such as X and Z are positioned at remote corners of the key array. This of course necessitates increased effort by the operator in order to gain access to these less frequently used keys.

More specifically, a key arrangement based on analysis of trigrams (or trigraphs) in the English language and employing conventional key placement geometry is illustrated in FIG. 11. A similar key arrangement which adds the commonly used punctuation marks and the ten digits is illustrated in FIG. 9. The key arrangement illustrated in FIG. 12 is similar, but employs a completely different array for the ten digits, and also employs space keys. The key arrangement of FIG. 10 is a four row arrangement which is further distinguished from the arrangement of FIG. 11 in that all of the aforementioned letter sequences except I-N-G are displayed vertically therein.

FIGS. 13 and 14 illustrate embodiments of the invention wherein both the key arrangement and the key placement geometry are based on different human engineering concepts. In FIG. 13 there is shown a keyboard incorporating the invention in which the keys are arranged along arcuate lines so as to accommodate the natural pivotal movement of the hands of the operator at the wrists. In FIG. 14 there is shown a keyboard incorporating the invention in which the keys are positioned so as to accommodate the natural pivotal movement of the arms of an operator from the shoulders and elbows. These arrangements are intended to facilitate not only increased data input rates but also to reduce operator fatigue during the use of a keyboard incorporating the invention. It will be further understood that various other keytop arrangements based on human engineering concepts may be provided, if desired.

As will be appreciated by those skilled in the art, all of the keytop arrangements illustrated in FIGS. 9-14 are primarily useful in keyboards intended for use in conjunction with data input operations of the type presently performed by typewriter-like data input devices where most of the keys are for leters or numbers. It is contemplated, however, that many embodiments of the invention will utilize entirely different key arrangements which are designed in accordance with the concepts of human engineering in order to facilitate the inputting of data relating to a particular activity. In fact, many keyboards incorporating the invention will utilize keys which are entirely different from the keys of an ordinary typewriter. For example, in a keyboard intended for use in inputting data relating to bookkeeping activities, a single key of the keyboard might be utilized to input the phrase "CHECK NO.," another key of the keyboard might be utilized to input the phrase "PAY TO THE ORDER OF" and another key might be utilized to input the bank account number of the individual utilizing the keyboard. A keyboard incorporating the invention and intended for use as a data input device at a nursing station would be distinct from a conventional typewriter-type keyboard, but would also be distinct from keyboards intended for use in other operations. Further rearrangements and modifications would be incorporated into a keyboard intended for use as point of sale data input devices, and in fact it is entirely possible that different key arrangements would be utilized in point of sale data input devices intended for use in the various departments of a particular store, or the like. This is because the cost of special developments is low.

Figure 8:
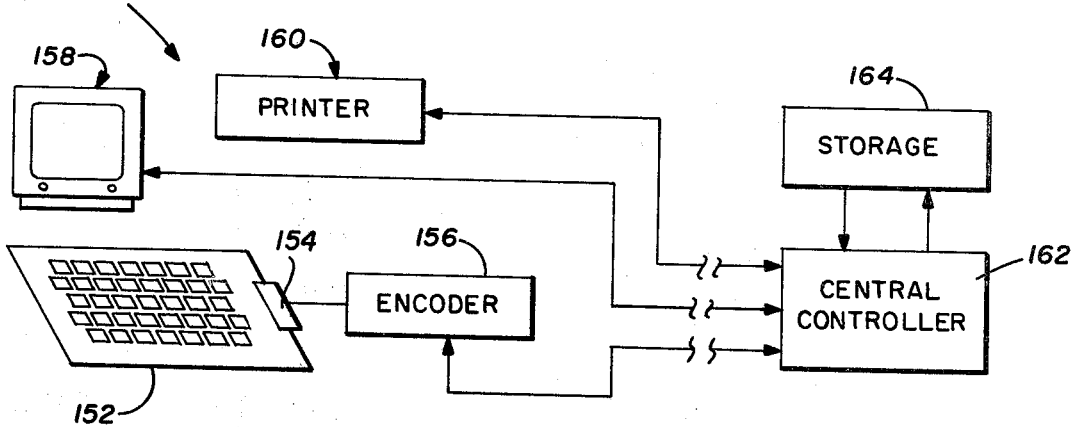
FIG. 8 is an illustration of a data input system incorporating the invention.

Referring now to FIG. 8, there is shown a data input system 150 incorporating the invention. The data input system 150 utilizes one or more keyboards, 152 each incorporating the invention and each specifically designed for use in conjunction with a particular data input activity. The various keyboards 152 which are utilized in the data input system 150 are all interchangeable with respect to a connector 154 which may comprise a conventional edge connector. Moreover, each keyboard 152 is constructed in accordance with the human engineering concepts discussed hereinbefore in connection with FIGS. 3-7. That is, the keyboards 152 are designed such that an operator may slide his fingers from key to key and actuate a key with minimum vertical motion. The keys of the keyboard 152 are also preferably arranged such that the most often used keys are the most conveniently located, and such that movement between keys of the keyboard is in accordance with the natural movements of the hands and arms of the operator as well as high frequency of sequential use of the arrangement of keys.

In the operation of the data input system 150, the connector 154 functions to transfer the fact that a particular key of the keyboard 152 has been actuated to an encoder 156. It is contemplated that the keyboard 152, the connector 154, and the encoder 156 will be located at a point convenient to the operator, such as in the home, at a work station, or in the classroom. In most situations some sort of data output device will also be situated at this location. For example, the data output device may be a visual display device 158 such as a conventional television set of the type commonly utilized to receive commercial television broadcasts. Other devices might incorporate a visual character device such as strips of matrix characters made up of light emitting diodes (LED's). In some applications of the invention it will also be convenient to employ a hard copy printer 160 at the same location as the keyboard 152 and the associated components of the data input system 150. It is contemplated, however, that in many instances the costs involved in providing a high capacity printer at this location will be prohibitive and only simple printers would be commonplace. Letter matrices of LED's might be used for feedback allowing one or two lines of characters.

The data input system 150 further includes a central controller 162 having an input connected to the encoder 156 and having outputs connected to the display device 158 and/or the printer 160. The central controller 162 comprises any suitable automatic digital data processing device, such as a properly programmed digital computer. Preferably, the digital computer would be of the mini-computer variety. It will be understood that a wide variety of different types of automatic digital processing machines are available for use in conjunction with the present invention, and if more appropriate, a hardwired system or an analog system could alternatively be used. Also, suitable data storage apparatus 164 such as random access devices, or mass devices such as magnetic tapes or magnetic discs will normally be utilized in conjunction with the central controller 162.

In the operation of the data input system 150, a keyboard 152 incorporating the invention and designed specifically for use in conjunction with a particular data inputting activity is inserted into the connector 154. Thereafter, the keyboard 152 is utilized to input data to the central controller 162 through the connector 154 and the encoder 156. It will be understood that various additional components or peripheral devices may be utilized in the data inputting function, for example, the data input system 150 may incorporate conventional switching circuitry, conventional multiplexing circuitry, conventional modem circuitry, etc.

Depending on the selected operational mode of the data input system 150, the data which is entered into the central controller 162 by means of the keyboard 152 may simultaneously be either displayed on the display device 158 and/or recorded by the printer 160. From time to time during the operation of the system the central controller 162 will perform various functions on the data which is received from the keyboard 152, such as addition, subtraction, multiplication, division, comparison, storage, etc. Also, this data, either as entered from the keyboard 152 or after processing by the central controller 162 will from time to time be directed to the storage apparatus 164 for either short term or long term storage therein. At the conclusion of a particular data inputting activity, the particular keyboard 152 utilized in the activity may be disengaged from the connector 154 and replaced by a different keyboard 152, whereupon the data input system 150 is ready for use in an entirely different data inputting activity.

Figure 15:
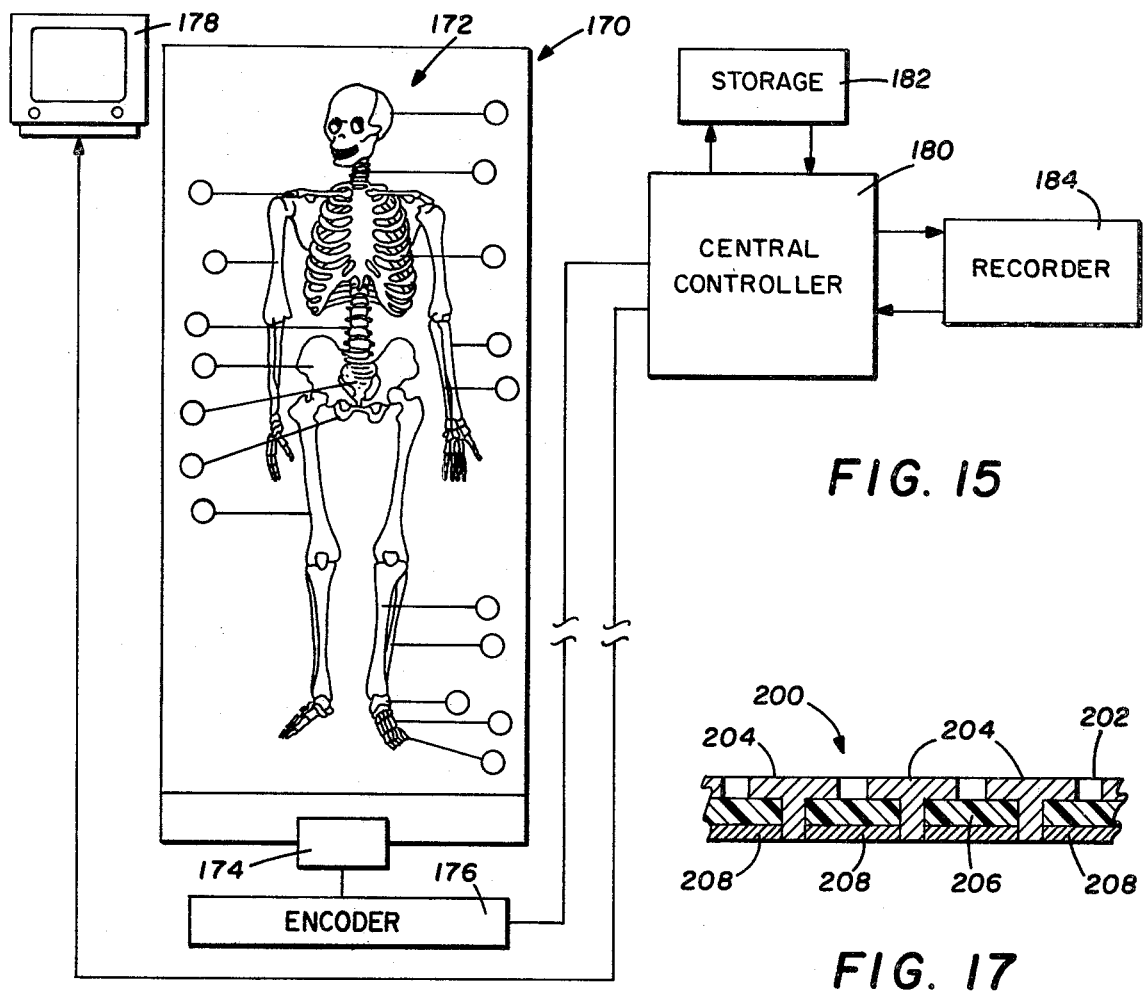
FIG. 15 is a schematic illustration of a programmed learning system incorporating the invention.

In FIG. 15 there is shown a programmed learning system 170 incorporating the invention. The programmed learning system 170 comprises a plurality of keyboards each constructed in accordance with one of the embodiments of the invention described hereinbefore in connection with FIGS. 3-7. A different keyboard may be provided for individual curriculum within the programmed learning system 170.

The keyboards 172 are each adapted for connection to a conventional connector 174, which may comprise an edge connector. The connector 174 is utilized to transfer the fact that a particular key of the keyboard 172 has been closed to an encoder 176. In the use of the programmed learning system 170 to the keyboards 172, the connector 174, and the encoder 176 are preferably situated at a location which is convenient to the student, such as the home or the classroom of the student. Also situated at this location is a visual display device 178 which may comprise a conventional television receiving set or other type of cathode ray tube. Hard copy generation may also be used.

The programmed learning system 170 further includes a central controller 180 having an input connected to the encoder 176 and having an output connected to the visual display device 178. The central controller 180 may comprise any suitable automatic digital data processing machines, such as a properly programmed digital computer. Preferably, such a computer would be of the mini-computer type, for example, the computer sold by Data General Corporation under Model Number Nova 1200 is suitable for use in the practice of the invention. It will be understood that a wide variety of different types and sizes of automatic digital data processing machines are available for use in the practice of the invention, and if desired, a hard-wired or analog system could alternatively be used. The programmed learning system 170 further includes conventional data storage apparatus 182 such as magnetic tapes or magnetic discs and conventional data recording apparatus 184 such as a card punch.

In the use of the programmed learning system 170, a keyboard 172 corresponding to a particular curriculum may be inserted into the connector 174. The central controller 180 is then actuated to retrieve from the storage apparatus 182 a series of questions corresponding to the particular lesson. The central controller 180 then actuates the visual display device 178 to sequentially display the questions corresponding to the lesson.

Responsive to the display of a particular question on the visual display device 178, the student actuates the key or keys of the keyboard 172 corresponding to his answer to the displayed question. If the answer is correct, the central controller actuates the recorder 184 to record this fact, and actuates the visual display device 178 to display the next question. If the answer is incorrect, the central controller actuates the recorder 184 to record this fact, and actuates the visual display device 178 to repeat the question. The number of times that the question is repeated may of course be predetermined in accordance with the requirements of a particular application. At the conclusion of the lesson the particular keyboard 172 may be removed from the connector 174 and is replaced by a different keyboard 172 corresponding to a different lesson if a different keyboard should be required such as might occur if one needed a Cyrillic alphabet, chemical symbols, etc. At this point in time the output of the recorder 184 may be delivered to the teacher or other authority and may ultimately be used in determining the grade of the student.

It will thus be understood that the programmed learning system 170 comprises a unique system for instructing students in various educational fields.

A similar embodiment of the invention may be provided for use in dynamic process control. Thus, a keyboard corresponding to a particular process may be built into a control room and the steps comprising the process are displayed on the visual display apparatus. Then, as each step of the process is completed, a key point may be activated whereupon the central controller causes the visual display device to display the next step of the process and actually change processing conditions.

Figure 16:
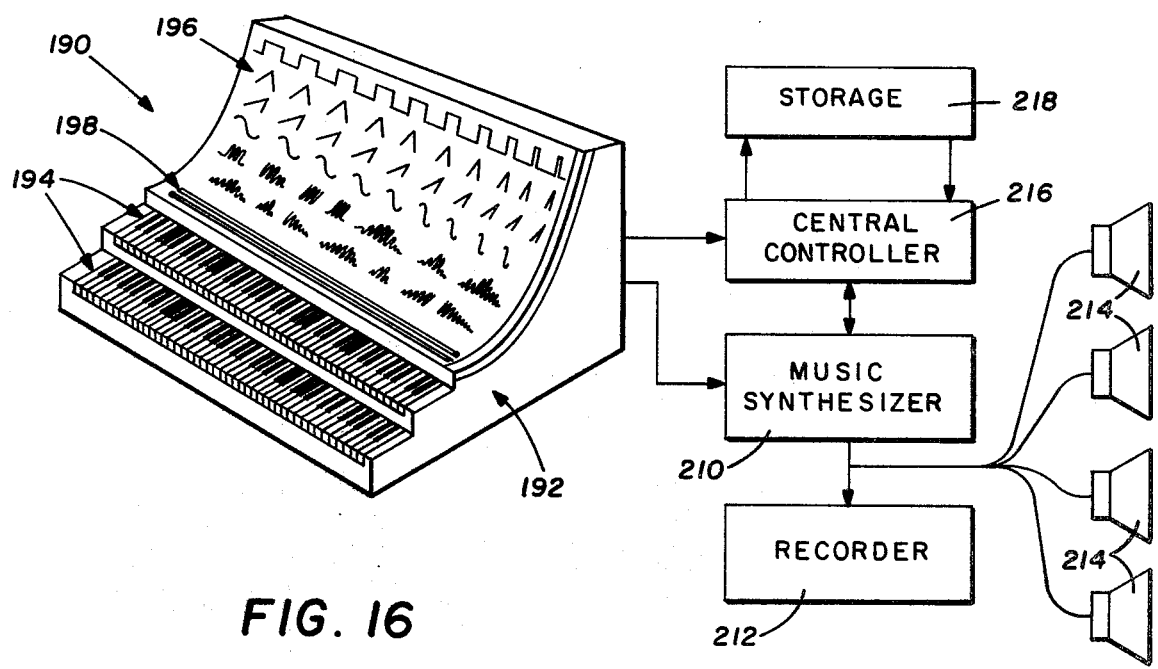
FIG. 16 is a schematic illustration of a music synthesizer system incorporating the invention.

Referring now to FIG. 16, there is shown a music synthesizer system 190 incorporating the invention. The music synthesizer system 190 comprises a console 192 which is utilized in controlling the system to generate musical tones. The console 192 includes one or more keyboards 194 of the type commonly associated with pianos and similar musical instruments. The console 192 further comprises one or more keyboards 196 incorporating the present invention and constructed in accordance with the embodiments of the invention illustrated in FIGS. 3-7. The keyboard 196 is connected to the console 192 by means of a connector (not shown) which may be an edge connector.

The keyboard 196 comprises a plurality of keys each designating a particular musical phenomenon. For example, the keys of the keyboard 196 may designate square waveforms of various lengths, triangular waveforms of various lengths, ramp waveforms of various lengths, attack and decay rates, sine waves, and various envelopes, all of which are useful in generating musical tones. The keyboard 196 further includes a key 198 which may be utilized to generate any tone signal within the range of the music synthesizer system, and also to generate continuously changing frequency. The key 198 comprises parallel conductors having terminals at their opposite ends and is actuated by establishing an electrical connection between the two conductors.

Figure 17:
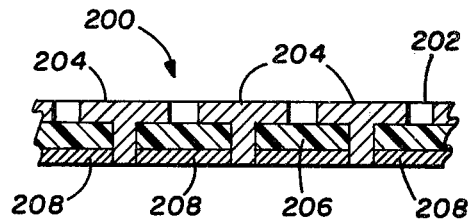
FIG. 17 is a partial sectional view of an alternative embodiment of the keyboard of the music synthesizer system shown in FIG. 16.

In FIG. 17, there is shown a key 200 comprising a modification of the key 198 of the console 192. The key 200 comprises a continuous conductor 202 similar to one of the continuous conductors of the key 198, and a plurality of individual conductors 204 positioned in a line adjacent the continuous conductor 202. The continuous conductor 202 and the individual conductors 204 are supported on a base 206 formed from an electrically insulated material. The individual conductors 204 are interconnected by a series of resistive elements 208 formed on the underside of the base 206. The key 200 is actuated by establishing an electrically conductive bridge between a selected individual conductor 204 and the continuous conductor 202. This may be accomplished either by means of the finger of the operator or by means of a positionable conductive bridge adapted to extend between the selected individual conductor 204 and the continuous conductor 202.

Referring again to FIG. 16, the music synthesizer system 190 further includes a music synthesizer circuit 210 which is responsive to actuation of the console 192 to produce the musical tone desired by the operator. The music synthesizer circuit 210 produces an output which is directed to a recorder 212 which may comprise a conventional tape recorder having as many channels as required. The output of the music synthesizer circuit 210 is further directed to a plurality of speakers 214 which transform the output into an audible output.

Data inputs to the music synthesizer system 190 which are generated by actuation of the keyboard 194 may be transmitted directly to the music synthesizer circuit 210. On the other hand, data inputs generated by actuation of the keyboard 196 may be transmitted to the music synthesizer circuit 210 by means of a central controller 216. The central controller comprises any suitable automatic data processing machine, such as a properly programmed digital computer. Preferably, the digital computer is of the mini-computer type such as the computer manufactured and sold by the Data General Corporation under Model Number Nova 1200. It wll be understood that a wide variety of different types of automatic digital data processing machines are available for use in conjunction with the present invention, or if desired, a hardwired or an analog computer system could alternatively be utilized. The music synthesizer system 190 also includes conventional data storage apparatus 218 such as magnetic tapes or magnetic discs which are operated in conjunction with the operation of the central controller 216.

In the operation of the music synthesizer system 190, the console 192 is utilized to actuate the music synthesizer circuits 210. This is accomplished either directly by operation of the keyboards 194 or indirectly by operation of the keyboard 196 and the central controller 216. In either event, the musical tones thus generated are audibly reproduced by means of the speakers 214 so that they can be heard by the operator. At the same time, the tones are recorded by the recorder 212 for subsequent reproduction. At any point in the operation of the system, the keyboard 196 may be replaced by an alternative keyboard having different operational characterstics with respect to the music synthesizer circuit 210.

Figure 18:
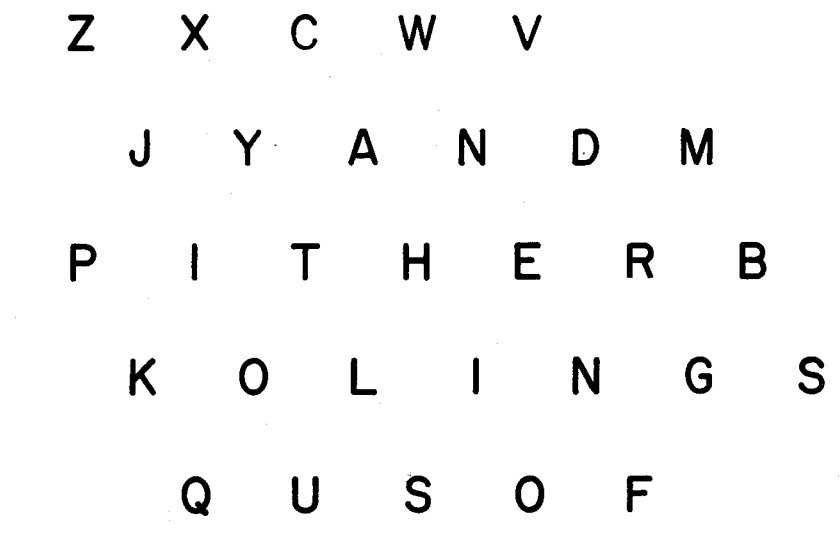

Referring specifically to FIG. 18, a keyboard provides an arrangement of letters (or characters) which are slightly different from the keyboards shown in FIGS. 9 through 14. The letter sequences of each of the trigrams and two letter combinations that are most commonly used, in accordance with generally accepted word analysis, are arranged adjacent to each other, and positioned so that they are on the same general row, column, or diagonal line of keys. For example THE, which is generally ranked No. 1 in frequency of trigram usage in the English language, is in the center of the keyboard and in a single laterally extending row so a simple wiping motion, when arranged on keyboards made according to the present invention where stroking is not necessary, will accomplish the typing of this word. Likewise, ING is immediately below the word THE, and is also in one of the three center lateral rows of the keyboard. A lateral wiping movement will type this particular trigram.

Note further that the two letter words IT and IN are in the center rows of the keyboard, and adjacent. The letters forming the word TO are in diagonal position on the keyboard shown. The digraph letter sequence QU is adjacent and can be typd with a wiping motion, as can the two letter word SO. It should also be noted that in the keyboard such as that shown in FIG. 18 I, N and O, which are used very frequently, appear more than once.

In the keyboard illustrated in FIG. 18, the letters can be arranged so that the fore and aft rows (vertical on the drawing) are in register. That is, in place of the alternate rows of letters being staggered or interdigitated, (that is alternate rows are offset so that the letters align with the spaces between the letters of the adjacent row), all rows can be made into a rectilinear configuration. The positioning of the fore and aft rows straight and in register will not affect the arrangement of the letters. Diagonal wiping motions as well as vertical and horizontal wiping motions can be utilized for achieving rapid typing of the trigram words and two letter combinations.

The keys to the left of the letter keys shown can be used for symbols or individual words used often in sequence. A symbol or word sequence as well as a letter sequence can be typed with a wiping motion. Therefore, the present concept is not limited merely to the typing of individual letter characters in sequence.

Infrequently used letters such as X and Z are positioned at relatively remote locations on the keyboard of FIG. 18 and also the previous keyboards of FIGS. 9 through 14. The other features of the previously described keyboards can be incorporated into the present device, including means for determining a home position of the fingers.

In selecting the keyboard arrangement the frequency of occurrence of the words and trigrams (including two letters or three letters) has been analyzed extensively. The keyboards of the present invention are arranged to have these trigrams and words grouped so that letters of at least three of the most commonly used trigrams are located sequentially adjacent, so that each can be typed with a wiping motion. The book *Secret and Urgent* by Fletcher Pratt, Garden City, New York, Blue Ribbon Books, 1942 contained an early study of frequency of uses of trigrams and words in the English language. The 10 most frequently used trigrams and the ten most frequently used words as determined by that study are listed below in Table I.

TABLE 1

| | TRIGRAMS | | WORDS | |
|---|---|---|---|---|
| RANK | ITEM | ≯ TIMES OCCURRED IN 20,000 WORDS | ITEM | # TIMES OCCURRED IN 10,000 WORDS |
| 1 | THE | 1054 | THE | 420 |
| 2 | ING | 317 | OF | 222 |
| 3 | ENT | 234 | AND | 142 |
| 4 | ION | 232 | TO | 132 |
| 5 | FOR | 177 | IN | 111 |
| 6 | TIO | 177 | A | 108 |
| 7 | ERE | 162 | IS | 72 |
| 8 | AND | 154 | THAT | 61 |
| 9 | VER | 147 | FOR | 49 |
| 10 | HER | 145 | IT | 43 |

In the work displayed in Table I it was shown that a relatively small number of words made up a very large percentage of the written language.

Another study, far more comprehensive, was published in 1967. It included a total of 1,014,232 words taken from fifteen kinds of written material selected from five hundred samples. Just over fifty thousand different words were contained in it. Many analyses were made of this material. The information from the study was used as a form of a book by Henry Kucera and Francis W. Nelson, *Computational Analysis of Present Day American English*, published by the Brown University Press in 1967. The Rank List in the book includes the entire corpus with Rank in Descending Order and affirms the very interesting fact about the frequency versus percentage of words in the written language.

The top twenty words from the "Rank list" are reproduced below as Table II.

TABLE II

| | |
|---|---|
| 69971-15-500 | THE |
| 38411-15-500 | OF |
| 28852-15-500 | AND |
| 26149-15-500 | TO |
| 23237-15-500 | A |
| 21341-15-500 | IN |
| 10595-15-500 | THAT |
| 10099-15-485 | IS |
| 9816-15-466 | WAS |
| 9543-15-428 | HE |
| 9489-15-500 | FOR |

TABLE II-continued

| | |
|---|---|
| 8756-15-500 | IT |
| 7289-15-500 | WITH |
| 7250-15-500 | AS |
| 6997-15-435 | HIS |
| 6742-15-500 | ON |
| 6377-15-499 | BE |
| 5378-15-500 | AT |
| 5305-15-498 | BY |
| 5173-15-338 | I |

Table II also gives the number of occurrences of each word, the number of types of material in which it appears and the number of samples in which it appears. This is followed by the word itself. THE occurs 69,971 times out of 1,014,232. That is 6% of all the words in the corpus. The next word is OF. It occurs 36,411 times so that THE plus OF make up 10.49% of the total. The first six words in the list—THE, OF, AND, TO, A and IN—make up 20.31% of the total. The first 18 words make up 30%. Thus having OF and TO included in sequence on keys and including the trigram ING (which places "IN" correctly), and the letters of at least two other of the ten most frequently used trigrams, it can be seen that a high percent of the input of the keyboard will be wiping motions. With ING, AND and THE as the trigrams along with OF and TO, a significant speed increase may be noted. The keyboard described in this patent application allows many combinations of letters to be input with simple sweeping or wiping motion.

Thus, it is envisioned that the keyboards of the present invention should have at least three trigrams selected from the ten most commonly used trigrams in sequence, and also to have the letters of at least the two most commonly used two letter words adjacent and in sequence. The data input speed is greatly increased by the simple wiping motion particularly where trigrams or three letter words are involved. With five of the ten most commonly used trigrams arranged for wiping motion input, speed is increased even more.

The keyboards shown herein have letters arranged in five rows of keys, and by having the most commonly used trigram in the center rows, that is, not in the lower or the upper rows when viewed in the normal relationship, and having the trigrams operable by wiping the fingers laterally, speed is also greatly increased. The keyboard of FIG. 18 of course has the words or trigrams AND; THE; and ING in position in the center rows and operable by in line laterally wiping strokes which are somewhat faster than wiping motions requiring change of direction.

It should be noted that the sequence of letters can be wiped with a change of direction. For example, in FIG. 18, the arrangement of ION is a "V" shape wiping motion from I to O (in the bottom row) and then back up to N in the second from the bottom row. Diagonal strokes also can be utilized and the word TWO is formed in this manner in the keyboard of FIG. 18. Deviations so that "L" shaped motions comprising the adjacent positioning also are acceptable.

Because of human limitation of function, existing methods of key stroking are difficult to perform. The present invention keyboard shifts most key actuation to a wiping motion that is a very natural motion. With this in mind the key arrangements reflect the way letter sequences occur in the natural language. The key arrangements provide certain letter combinations that allow straight line or curved or angular line sequences of a substantial number of these combinations.

From the foregoing, it will be understood that the present invention relates to an improvement relating to data input systems which comprises numerous advantages over the prior art. Perhaps most importantly, in accordance with the present invention there is provided a low cost keyboard designed in accordance with human engineering concepts in order to fulfill the specific requirements of a particular data input activity. Such a keyboard preferably comprises an upper surface which is at least substantially smooth so as to facilitate sliding movement of the fingers of the operator between the keys. Moreover, each key is designed for actuation with a minimum of movement of the fingers of the operator.

Human engineering concepts are also employed in the practice of the invention with respect to the arrangement of the keys of the keyboard. Thus, frequently used keys are positioned for ready access by the operator, and keys which are frequently used in combination with other keys are located adjacent one another. The keys of the keyboard are also preferably arranged along arcuate lines so as to accommodate the natural hand and arm motions of the operator.

Data input systems incorporating the invention may comprise a plurality of keyboards each interchangeable with respect to a connector that is utilized to interconnect the keyboard and the remainder of the system. By this means the invention is advantageously utilized in conjunction with programmed learning systems. A similar use of the invention relates to dynamic process control, whereby a different keyboard may be provided for each particular process which is to be controlled under the system. The invention is further useful in conjunction with music synthesizer systems wherein a keyboard incorporating the invention may be utilized in conjunction with a central controller to regulate the operation of the music synthesizer circuit.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:
1. A keyboard apparatus comprising:
  means defining a plurality of keys including at least one key individual to each of selected ones of the letters comprising the standard 26 letter alphabet arranged in a plurality of rows;
  the keys being positioned in a predetermined array characterized by the positioning of selected keys individual to selected letters that are frequently used in sequence adjacent one another and in accordance with such sequence, and including the following groupings:
  the positioning of keys individual to the letters T, H and E adjacent one another and in sequence;
  the positioning of keys individual to the letters I, N and G adjacent one another and in sequence;
  the positioning of keys individual to the letters A, N and D adjacent one another and in sequence;
  the positioning of keys individual to the letters I, O and N adjacent one another and in sequence; and the positioning of keys individual to the letters O, N and E adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys; and each of the keys being adapted for actuation in response to minimum movement of the fingers of an operator perpendicular to the predetermined surface configuration.

2. The keyboard of claim 1 wherein there are at least five rows of keys counted in direction generally normal to a user's body and each row extending laterally and wherein the keys carrying the letter sequence THE, ING and AND are each arranged in the center three rows and are actuated by lateral movement of a user's fingers within a single row.

3. The keyboard of claim 2 wherein the row adjacent a user's body has keys individual to the letters Q and U adjacent each other.

4. The keyboard of claim 1 further including a grouping of keys individual to the letters E, N and D adjacent one another and in sequence.

5. The keyboard apparatus according to claim 1 wherein the plurality of rows are arranged along arcuate paths to accommodate the natural motions of the fingers, hands and arms of an operator.

6. A keyboard apparatus comprising:

means defining a plurality of spaced keys including at least one key individual to each of the letters comprising the standard 26 letter alphabet arranged in a plurality of rows:

the keys being positioned in a predetermined array characterized by the positioning of selected keys individual to letters that are frequently used in sequence adjacent one another and in accordance with such sequence, and including the following groupings:

the positioning of keys individual to the letters T, H and E adjacent one another and in sequence;

the positioning the keys individual to the letters I, N and G adjacent one another and in sequence;

the positioning of keys individual to the letters A, N and D adjacent one another and in sequence;

the positioning of keys individual to the letters I, O and N adjacent one another and in sequence;

the positioning of keys individual to the letters Q and U adjacent one another;

the positioning of keys individual to the letters E, N and D adjacent one another and in sequence; and the positioning of keys individual to the letters O, N and E adjacent one another and in sequence;

the keys having actuating surfaces each normally positioned for cooperation with the actuating surfaces of the remaining keys to define a predetermined surface configuration;

a first row containing keys individual to the letters Z, X, W and V in the recited sequence from left to right;

a second row containing keys individual to the letters J, Y, A, N, D and M adjacent one another and in the recited sequence, such that the key individual to the letter J is located in a position no more than one-half of the key space offset from registry with the letter Z of said first row;

a third row containing keys individual to the letters I, T, H, E, R and B adjacent one another and in sequence, such that the key individual to the letter T is located in a position not more than one-half key space offset from registry with the key individual to the letter Y of said second row;

a fourth row containing keys individual to the letters O, L, I, N, G and S adjacent one another and in sequence, such that the key individual to the letter O is located in a position not more than one-half key space offset from registry with the key individual to the letter T of said third row;

means extending between the keys and comprising a generally coplanar continuation of the predetermined surface configuration for facilitating sliding movement of the fingers of an operator between adjacent keys, the sliding movement being substantially parallel to the predetermined surface configuration without requiring a vertical movement of the fingers of the operator with respect to the predetermined surface configuration thereby providing for the sequential actuation of one of the pedetermined array of keys by a sliding action of a single finger of the operator across the keys comprising the predetermined array of keys; and each of the keys being adapted for actuation in response to minimum movement of the fingers of an operator perpendicular to the predetermined surface configuration.

7. A keyboard apparatus comprising:

means defining a plurality of keys including at least one key individual to each of selected letters comprising the standard 26 letter alphabet arranged in a plurality of rows;

the keys being positioned in a predetermined array characterized by the positioning of selected ones of keys individual to letters that are frequently used in sequence adjacent one another and in accordance with such sequence, and including the following groupings:

the positioning of keys invdividual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantaily parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predetermined surface configuration so that an individual operator finger can be slid from one key to the next in the same row or adjacent rows without stroking the finger for actuation of sequential keys; and wherein said plurality of rows comprise:

a first row containing keys individual to the letters W, D, T, B, K, S and Z adjacent one another and in sequence;

a second row containing keys individual to the letters P, A, H, I, N and G adjacent one another and in sequence, such that the key individual to the letter P is located in a position between keys individual to the letters W and D of said first row and the key individual to the letter G is located in a position between keys individual to the letters S and Z of said first row;

a third row containing keys individual to the letters J, F, L, E, O, U and M adjacent one another and in sequence, such that the key individual to the letter J is located in a position corresponding to the position of the key individual to the letter W of said first row and the key individual to the letter M is located in a position corresponding to the position of the key individual to the letter Z of said first row; and a fourth row containing keys individual to the letters Y, C, R, V, Q and X adjacent one another and in sequence, such that the key individual to the letter Y is located in a position between the keys individual to the letters F and L of said third row.

8. A keyboard apparatus comprising:

means defining a plurality of keys including at least one key individual to each of selected letters comprising the standard 26 letter alphabet arranged in a plurality of rows;

the keys being positioned in a predetermined array characterized by the positioning of selected ones of keys individual to letters that are frequently used in sequence adjacent one another and in accordance with such sequence, and including the following groupings:

the positioning of keys individual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predetermined surface configuration so that an individual operator finger can be slid from one key to the next in the same row or adjacent rows without stroking the finger for actuation of sequential keys; and wherein said plurality of rows comprise:

a first row containing keys individual to the letters Z, X, W, M and J adjacent one another and in sequence;

a second row containing keys individual to the letters Y, A, D, V and P adjacent one another and in sequence, such that the key individual to the letter Y is located in a position corresponding to the position of the key individual to the letter Z of said first row and the key individual to the letter P is located in a position corresponding to the position of the key individual to the letter J of said first row;

a third row containing keys individual to the letters B, T, H, E, R and K adjacent one another and in sequence, such that the key individual to the letter T is located in a position between keys individual to the letters Y and A of said second row;

a fourth row containing keys individual to the letters L, I, N, G and S adjacent one another and in sequence, such that the key individual to the letter L is located in a position corresponding to the position of the key individual to the letter Y located in said second row, and a fifth row containing keys individual to the letters F, O, C, U and Q adjacent one another and in sequence, such that the key individual to the letter F is located in a position between keys individual to the letters L and I of said fourth rows.

9. A keyboard apparatus comprising:

means defining a plurality of keys including at least one key individual to each of selected letters comprising the standard 26 letter alphabet arranged in a plurality of rows;

the keys being positioned in predetermined array characterized by the positioning of selected ones of keys individual to letters that are frequently used in sequence adjacent one another and in accordance with such sequence, and including the following groupings:

the positioning of keys individual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predetermined surface configuration so that an individual operator finger can be slid from one key to the next in the same row or adjacent rows without stroking the finger for actuation of sequential keys; and wherein said plurality of rows comprise:

a first row containing keys individual to the letters Z, X, W and V adjacent one another and in sequence;

a second row containing keys individual to the letters J, Y, A, N, D and M adjacent one another and in sequence, such that the key individual to the letter Y is located in a position between keys individual to the letters Z and X of said first row;

a third row containing keys individual to the letters I, T, H, E, R and B adjacent one another and in sequence, such that the key individual to the letter T is located in a postion between keys individual to the letters J and Y of said second row;

a fourth row containing keys individual to the letters O, L, I, N, G and S adjacent one another and in sequence, such that the key individual to the letter O is located in a position corresponding to the position of the key individual to the letter J of said second row; and a fifth row containing keys individual to the letters P, K, F, O, C, U and Q adjacent one another and in sequence, such that the key individual to the letter P is located in a position corresponding to the position of the key individual to the letter I in said third row.

10. A keyboard apparatus comprising:

means defining a plurality of keys including at least one key individual to each of selected letters comprising the standard 26 letter alphabet arranged in a plurality of rows;

the keys being positioned in a predetermined array characterized by the positioning of selected ones of keys individual to letters that are frequently used in sequence adjacent one another and in accordance with such sequence, and including the following groupings:

the positioning of keys individual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantially movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predetermined surface configuration so that an individual operator finger can be slid from one key to the next in the same row or adjacent rows without stroking the finger for actuation of sequential keys; and wherein said plurality of rows comprise:

a first row containing keys individual to the letters Z, X, W and V adjacent one another and in sequence;

a second row containing keys individual to the letters Q, U, A, D and Y adjacent one another and in sequence, such that the key individual to the letter U is located in a position between keys individual to the letters Z and X of said first row;

a third row containing keys individual to the letters O, T, H, E, R and M adjacent one another and in sequence, such that the key individual to the letter T is located in a position between keys individual to the letters Q and U of said second row;

a fourth row containing keys individual to the letters P, L, I, N, G and S adjacent one another and in sequence, such that the key individual to the letter P is located in a position corresponding to the position of the key individual to the letter Q of said second row; and a fifth row containing keys individual to the letters K, F, O, C, B and J adjacent one another and in sequence, such that the key individual to the letter K is located in position corresponding to the position of the key individual to the letter T located in said third row.

11. A keyboard apparatus comprising:

means defining a plurality of keys including at least one key individual to each of selected letters comprising the standard 26 letter alphabet arranged in a plurality of rows;

the keys being positioned in a predetermined array characterized by the positioning of selected ones of keys individual to letters that are frequently used in sequence adjacent one another and in accordance with such sequence, and including the following groupings:

the positioning of keys individual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predeterined surface configuration so that an individual operator finger can be slid from one key to the next in the same row or adjacent rows without stroking the finger for actuation of sequential keys; and wherein said plurality of rows comprise:
- a first row containing keys individual to the letters Z, X, O, B and J adjacent one another and in sequence;
- a second row containing keys individual to the letters Q, U, T, F and M adjacent one another and in sequence, such that the key individual to the letter Q is located in a position between keys individual to the letters Z and X of said first row;
- a third row containing keys individual to the letters P, L, H, A and Y adjacent one another and in sequence, such that the key individual to the letter P is located in a position between keys individual to the letters Q and U of said second row;
- a fifth row containing keys individual to the letters C, N and R adjacent one another and in sequence, such that the key individual to the letter C is located in a position between keys individual to the letters W and I of said fourth row;
- a fourth row containing keys individual to the letters W, I, E, D and V adjacent one another and in sequence, such that the key individual to the letter W is located in a position between keys individual to the letters P and L of said third row;
- a sixth row containing a key individual to the letter G, such that said key individual to the letter G is located in a position corresponding to the position of the key individual to the letter N of said fifth row; and
- a seventh row containing keys individual to the letters K and S adjacent one another and in sequence, such that the key individual to the letter K is located in a position between keys individual to the letters C and N of said fifth row.

12. A keyboard apparatus comprising:

means defining a plurality of keys including at least one key individual to each of selected letters comprising the standard 26 letter alphabet arranged in a plurality of rows;

the keys being positioned in a predetermined array characterized by the positioning of selected ones of keys individual to letters that are frequently used in sequence adjacent one another and in accordance with such sequence, and including the following groupings:

the positioning of keys individual to the letters T, H and E adjacent one another and in sequence;

the positioning of keys individual to the letters I, N and G adjacent one another and in sequence;

the keys having actuating surfaces each normally positioned for cooperation with the actuating surfaces of the remaining keys to define a predetermined surface configuration; means extending between the keys and comprising a generally regular continuation of the predetermined surface configuration for facilitating sliding movement of the fingers of an operator between adjacent keys, the sliding movement being substantially parallel to the predetermined surface configuration without requiring substantial movement of the fingers of the operator in direction generally normal to the predetermined surface configuration thereby providing for the sequential actuation of one of the predetermined array of keys by a sliding action of a single finger of the operator across the keys comprising the predetermined array of keys;

each of the keys being adapted for actuation in response to minimum movement perpendicular to the predetermined surface configuration so that an individual operator finger can be slid from one key to the next in the same row or adjacent rows without stroking the finger for actuation of sequential keys; and wherein said plurality of rows comprise:
- a first row containing keys individual to the letters Z, X, C, W and V adjacent one another and in sequence;
- a second row containing keys individual to the letters J, Y, A, N, D and M adjacent one another and in sequence, such that the key individual to the letter J is located in a position between keys individual to the letters Z and X of said first row;
- a third row containing keys individual to the letters P, I, T, H, E, R and B adjacent one another and in sequence, such that the key individual to the letter I is located in a position between keys individual to the letters J and Y of said second row;
- a fourth row containing keys individual to the letters K, O, L, I, N, G and S adjacent one another and in sequence, such that the key individual to the letter K is located in a position corresponding to the position of the key individual to the letter J of said second row; and
- a fifth row containing keys individual to the letters Q, U, S, O, and F adjacent one another and in sequence, such that the key individual to the letter Q is located in a position corresponding to the position of the key individual to the letter I in said third row.

13. The keyboard apparatus according to claim 8 wherein said first row contains keys individual to the letters W, M and J adjacent one another and in sequence, such that the key individual to the letter W is located in a position between keys individual to the letters Y and A of said second row of said plurality of rows; and said plurality of rows further include a sixth row containing keys individual to the letters Z and X adjacent one another an in sequence, such that the key individual to the letter Z is located in a position between keys individual to theletters W and M of said first row.

* * * * *

UNITED STATES PATENT OFFICE
CERTIFICATE OF CORRECTION

Patent No. 4,211,497         Dated July 8, 1980

Inventor(s) Edward B. Montgomery

It is certified that error appears in the above-identified patent and that said Letters Patent are hereby corrected as shown below:

Column 22, line 46, (Claim 9, line 6), after "in" insert --a--. Column 23, line 64, (Claim 10, line 26) "substantially" should be --substantial--. Column 25, lines 28-33, (Claim 11, lines 60-65) should be removed and inserted immediately following line 22 of Column 25. Column 26, line 60, (Claim 13, line 12) "theletters" should be --the letters--.

Signed and Sealed this

Thirtieth Day of December 1980

[SEAL]

Attest:

SIDNEY A. DIAMOND

Attesting Officer        Commissioner of Patents and Trademarks